United States Patent
Moertle et al.

(10) Patent No.: US 6,986,201 B2
(45) Date of Patent: *Jan. 17, 2006

(54) METHODS FOR REPLACING COMBUSTOR LINERS

(75) Inventors: George E. Moertle, Cincinnati, OH (US); Edward John Emilianowicz, West Chester, OH (US); Scott Howard Pelletier, Cincinnati, OH (US)

(73) Assignee: General Electric Company, Schenecady, NY (US)

( * ) Notice: Subject to any disclaimer, the term of this patent is extended or adjusted under 35 U.S.C. 154(b) by 44 days.

This patent is subject to a terminal disclaimer.

(21) Appl. No.: 10/310,249

(22) Filed: Dec. 4, 2002

(65) Prior Publication Data

US 2004/0107574 A1 Jun. 10, 2004

(51) Int. Cl.
*B23P 15/00* (2006.01)

(52) U.S. Cl. .............. 29/890.01; 29/402.08; 29/402.16; 29/889.2

(58) Field of Classification Search ........... 29/80.01, 29/402.08, 402.03, 402.01, 402.16, 426.4, 29/889, 889.2; 60/757, 750, 752, 754, 39.36
See application file for complete search history.

(56) References Cited

U.S. PATENT DOCUMENTS

| | | | |
|---|---|---|---|
| 3,842,595 A | * | 10/1974 | Smith et al. .............. 60/39.36 |
| 4,485,630 A | * | 12/1984 | Kenworthy ................ 60/757 |
| 4,614,082 A | | 9/1986 | Sterman et al. |
| 4,773,227 A | | 9/1988 | Chabis |
| 4,912,922 A | * | 4/1990 | Maclin ..................... 60/796 |
| 5,142,871 A | | 9/1992 | Lampes et al. |
| 5,154,060 A | | 10/1992 | Walker et al. |
| 5,181,379 A | | 1/1993 | Wakeman et al. |
| 5,241,827 A | | 9/1993 | Lampes |
| 5,261,223 A | | 11/1993 | Foltz |
| 5,279,127 A | | 1/1994 | Napoli |
| 5,307,637 A | | 5/1994 | Stickles et al. |
| 5,323,604 A | | 6/1994 | Ekstedt et al. |
| 5,329,761 A | | 7/1994 | Ablett et al. |
| 5,363,643 A | * | 11/1994 | Halila ..................... 60/39.31 |
| 5,430,935 A | | 7/1995 | Yaworsky et al. |
| 5,826,431 A | * | 10/1998 | Makino et al. .............. 60/757 |
| 5,839,643 A | | 11/1998 | Inoue et al. |
| 6,049,978 A | | 4/2000 | Arnold |
| 6,079,199 A | | 6/2000 | McCaldon et al. |
| 6,141,862 A | | 11/2000 | Matsui et al. |
| 6,163,959 A | | 12/2000 | Arraitz et al. |
| 6,216,442 B1 | * | 4/2001 | Belsom et al. ............ 60/39.32 |
| 6,286,317 B1 | | 9/2001 | Burrus et al. |
| 6,345,441 B1 | | 2/2002 | Farmer et al. |
| 6,434,821 B1 | | 8/2002 | Nelson et al. |
| 6,568,079 B2 | * | 5/2003 | Farmer et al. ........... 29/890.01 |
| 6,581,285 B2 | * | 6/2003 | Emilianowicz .......... 29/890.01 |

FOREIGN PATENT DOCUMENTS

| | | |
|---|---|---|
| EP | 1174209 | 1/2002 |
| EP | 1266718 | 12/2002 |
| EP | 1267127 | 12/2002 |

* cited by examiner

*Primary Examiner*—Irene Cuda-Rosenbaum
(74) *Attorney, Agent, or Firm*—William Scott Andes; Armstrong Teasdale LLP

(57) ABSTRACT

A method enables replacement of a gas turbine engine combustor liner. The combustor has a combustion zone formed by inner and outer liners. A plurality of cooling features are formed by overhanging portions of the inner and outer liner liners. The method comprises cutting through at least one of the combustor inner and outer liner aft of an overhanging portion, wherein the portion of the combustor liner upstream from the cut remains coupled within the combustor, removing the portion of the combustor liner that is aft of the cut, and installing a replacement liner within the combustor such that the replacement liner extends aftward from the portion of the combustor liner that is upstream from the cut.

17 Claims, 3 Drawing Sheets

METHODS FOR REPLACING COMBUSTOR LINERS

BACKGROUND OF THE INVENTION

This invention relates generally to gas turbine engines, and more particularly, to methods for replacing forged unitary combustor liners used with gas turbine engine combustors.

A turbine engine includes a compressor for compressing air which is mixed with a fuel and channeled to a combustor wherein the mixture is ignited within a combustion chamber for generating hot combustion gases. At least some known combustors include a dome assembly, a bolt banding, and liners to channel the combustion gases to a turbine. The turbine extracts energy from the combustion gases for powering the compressor, as well as producing useful work to propel an aircraft in flight or to power a load, such as an electrical generator. The liners are coupled to the dome assembly at an upstream end with the bolt banding, and extend downstream from the bolt banding to define the combustion chamber.

At least some known liners are formed from forged and machined unitary bodies that include a plurality of cooling slots that are defined by integrally-formed overhanging portions. Accordingly, the regions of the liners adjacent such cooling slots are not subjected to the same degree of heat as other portions of the liner that are adjacent the combustion chamber, and as such, during operation thermal stresses may be induced within the liner. Over time, continued operation with thermal stresses may cause liners to thermally fatigue, causing weakening and/or cracking to develop within the liners.

Current repair methods include welding thermal fatigue cracks. Additionally, patches may be attached to areas of liners that are weakened by thermal stresses. However, if the thermal stresses have induced thermal fatigue or distress in larger areas of the liners, because of the complex shape of the liners, the combustor may not have enough structural integrity to enable patches to be attached. Furthermore, depending on the severity of the distress, welding patches within the liner may lead to a loss of dimensional stability of the liner. In such cases, repair of such liners is not a feasible option, and instead the entire combustor liner is replaced. Because the liner is coupled to the bolt band and the dome assembly, often the entire combustor must be disassembled for the liner to be replaced. Furthermore, when the fasteners are removed from the bolt band and dome assembly, precise dimensional relations between the components may be altered and as a result, special tooling may be required during re-assembly. Thus, replacing a forged combustor liner including cooling slots may be a time-consuming and expensive process.

BRIEF SUMMARY OF THE INVENTION

In one aspect, a method is provided for replacing a gas turbine engine combustor liner, wherein the combustor has a combustion zone formed by inner and outer liners, and the inner and outer liners each include a plurality of cooling features that are formed by overhanging portions of the inner and outer liners. The method comprises cutting through at least one of the combustor inner and outer liner aft of an overhanging portion, such a portion of the combustor liner upstream from the cut remains coupled within the combustor, removing the portion of the combustor liner that is aft of the cut, and installing a replacement liner within the combustor such that the replacement liner extends aftward from the portion of the combustor liner that is upstream from the cut.

In another aspect of the invention, a method is provided for replacing a portion of a combustor liner within a gas turbine engine combustor, wherein the combustor has a combustion zone formed by an inner and outer liner, and the inner and outer liners each include a support flange formed at a downstream end of each liner. The method comprises cutting between an outer surface and an inner surface of at least one of the inner and the outer liners, removing the portion of the at least one of the outer and inner liner that is aft of the cut, and installing a replacement liner into the combustor to replace the portion of the liner removed from the combustor.

In a further aspect, a method for replacing a portion of at least one deteriorated combustor liner within a gas turbine engine combustor is provided. At least one deteriorated liner includes an inner surface and an outer surface. The method comprises cutting radially through the deteriorated liner between the outer and inner surfaces, removing the portion of the deteriorated combustor liner that is aft of the cut from the combustor, and installing a replacement liner into the combustor to replace the portion of the liner removed from the combustor.

DETAILED DESCRIPTION OF THE INVENTION

Figure 1:
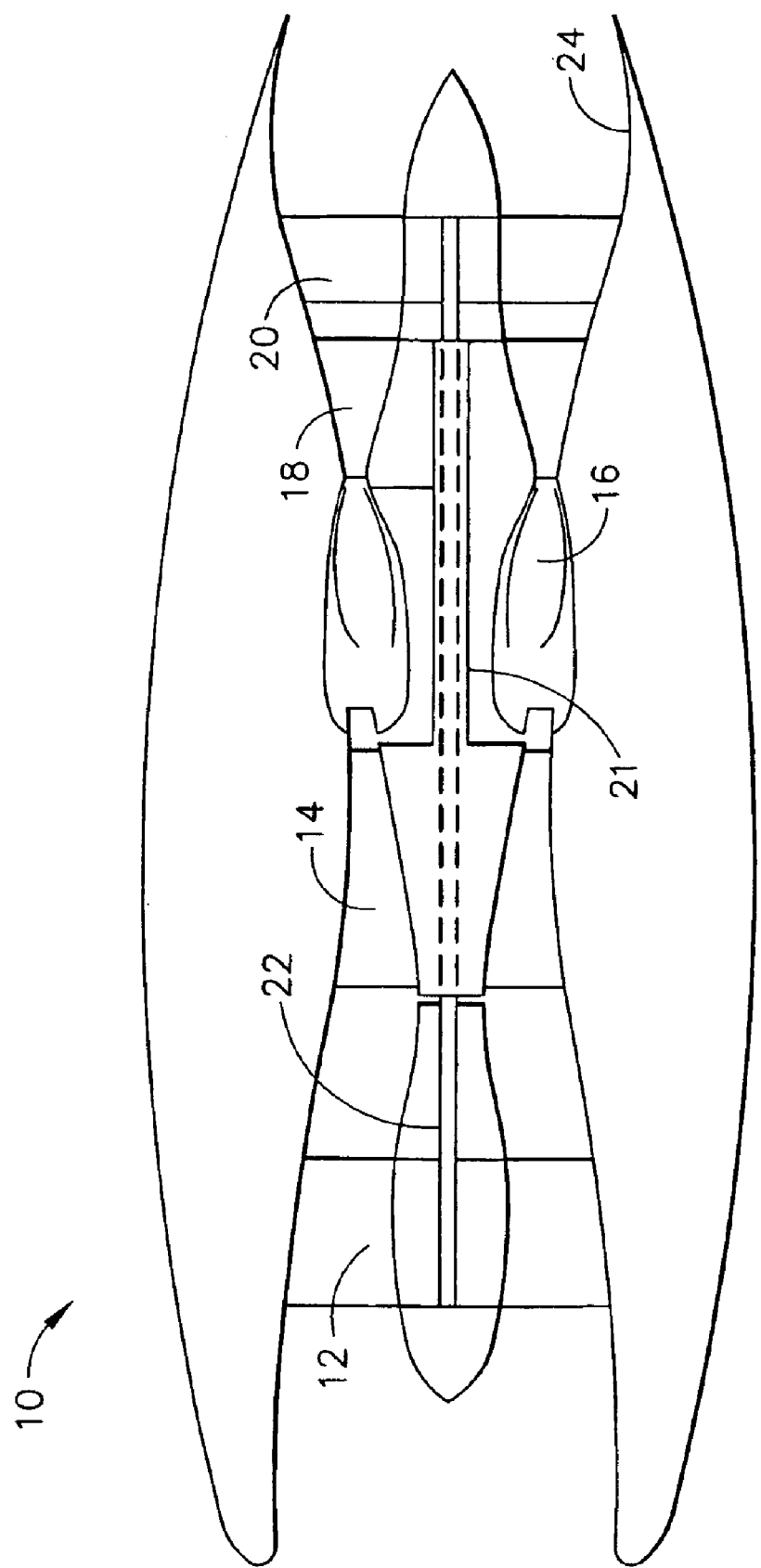
FIG. 1 is schematic illustration of a gas turbine engine.

FIG. 1 is a schematic illustration of a gas turbine engine 10 including a low pressure compressor 12, a high pressure compressor 14, and a combustor 16. Engine 10 also includes a high pressure turbine 18 and a low pressure turbine 20. Compressor 12 and turbine 20 are coupled by a first shaft 22, and compressor 14 and turbine 18 are coupled by a second shaft 21. In one embodiment, gas turbine engine 10 is a GE90 engine commercially available from General Electric Aircraft Engines, Cincinnati, Ohio. In another embodiment, gas turbine engine 10 is a CFM engine commercially available from General Electric Aircraft Engines, Cincinnati, Ohio.

In operation, air flows through low pressure compressor 12 supplying compressed air from low pressure compressor 12 to high pressure compressor 14. The highly compressed air is delivered to combustor 16. Airflow from combustor 16 drives turbines 18 and 20 and exits gas turbine engine 10 through a nozzle 24.

Figure 2:
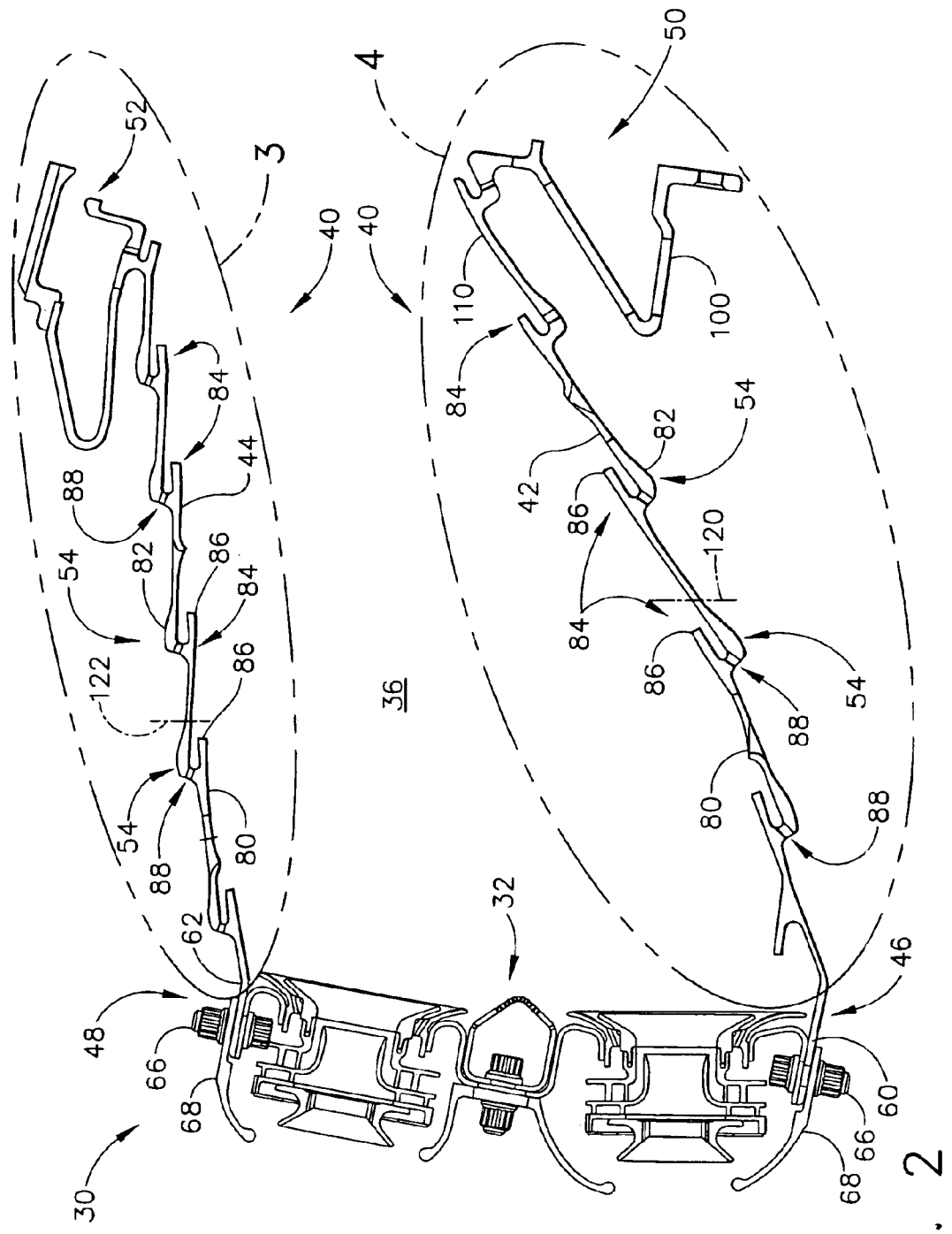
FIG. 2 is a partial cross-sectional view of an exemplary combustor assembly that may be used with the gas turbine engine shown in FIG. 1.
Figure 3:
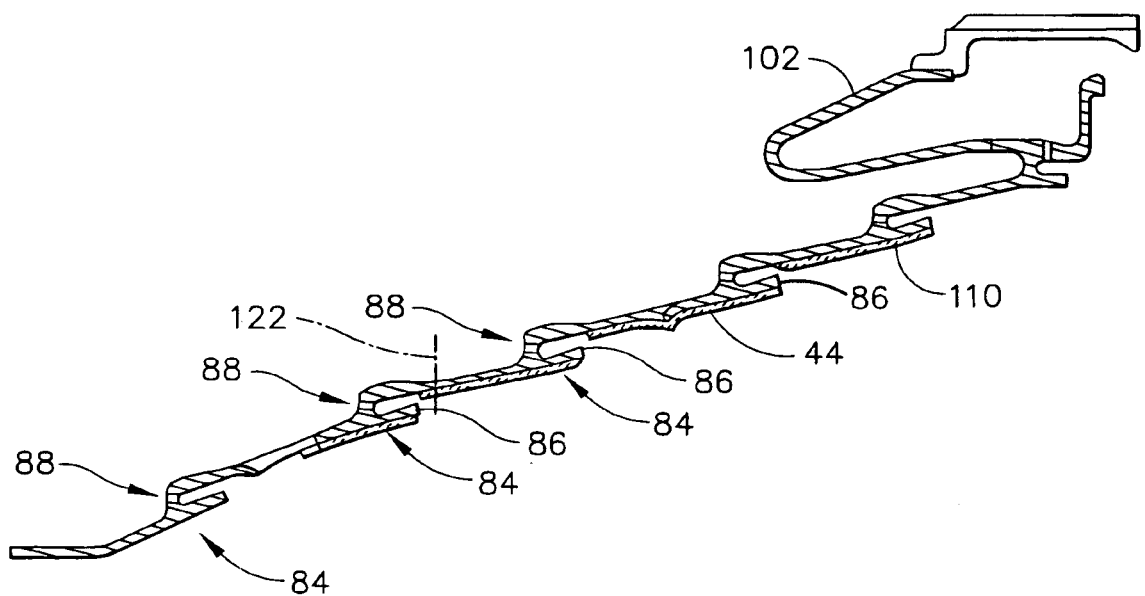
FIG. 3 is an enlarged view of an exemplary combustor liner used with the combustor shown in FIG. 2 and taken along area 3.
Figure 4:
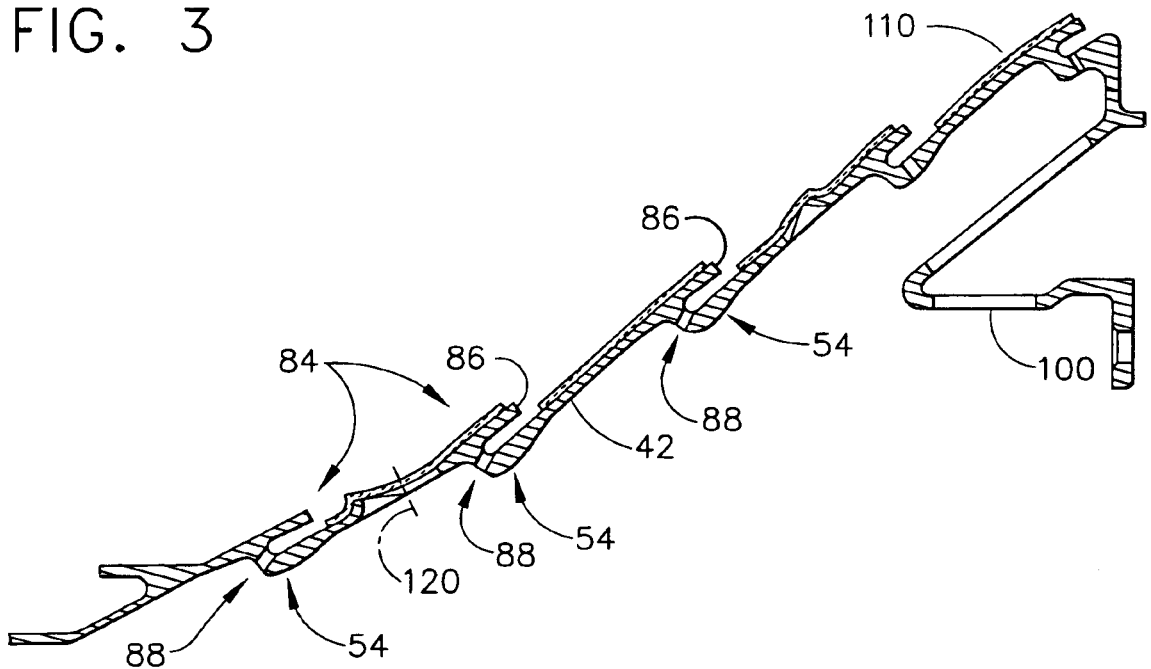
FIG. 4 is an enlarged cross-sectional view of an exemplary combustor liner used with the gas turbine engine shown in FIG. 2, and taken along area 4.

FIG. 2 is a partial cross-sectional view of a combustor 30 that may be used with gas turbine engine 10 (shown in FIG. 1). FIG. 3 is an enlarged view of a portion of combustor 30 taken along area 3. FIG. 4 is an enlarged view of a portion of combustor 30 taken along area 4. Combustor 30 may be used with gas turbine engine 10 shown in FIG. 1, and includes a dome assembly 32. A fuel injector (not shown) extends into dome assembly 32 and injects atomized fuel through dome assembly 32 into a combustion zone 36 of combustor 30 to form an airfuel mixture that is ignited downstream of the fuel injector Radially outer and radially inner supporting members (not shown) and combustor liners 40 forms annular combustion zone 36. Combustor liners 40 shield the outer and inner supporting members from the heat generated within combustion zone 36. More specifically, liners 40 include an inner liner 42 and an outer liner 44. Each liner 42 and 44 is annular and includes a respective upstream end 46 and 48 that is coupled to dome assembly 32, and a respective downstream end 50 and 52 that is coupled to a turbine nozzle (not shown).

Liners 42 and 44 are unitary between respective upstream and downstream ends 46 and 50, and 48 and 52. In the exemplary embodiment, liners 42 and 44 are forged from an enhanced oxidation resistant material that is machined to predefined dimensions. Each liner 42 and 44 includes a series of integrally formed steps 54, which each form a distinct portion of each combustor liner 44 and 42. Outer liner 44 and inner liner 42 also each include a bolt band 60 and 62 positioned adjacent to dome assembly 32. Liners 42 and 44 are connected downstream from bolt bands 62 and 60, respectively. Bolt bands 60 and 62 each include a plurality of openings (not shown) that are sized to receive fasteners 66 therein for joining combustor assembly 30 by securing liners 42 and 44, bolt bands 60 and 62, and a cowl assembly 68 to dome assembly 32.

Each combustor liner 40 includes a combustor liner surface 80, an exterior surface 82, and a series of overhang portions 84. Combustor liner surface 80 extends from dome assembly 32 to the turbine nozzle. Combustor liner surface 80 and exterior surface 82 are connected together at overhang portion 84 and form a rear facing edge 86.

A plurality of air-cooling features 88 extend through liners 42 and 44. More specifically, each overhang portion 84 is radially inward from a respective step 54, and each air-cooling feature 88 extends through liners 42 and 44 between a respective adjacent overhanging portion 84 and step 54. Air cooling features 88 include passages through liners 42 and 44 that receive air from an air plenum (not shown) to form a thin protective boundary of air between high temperature combustion gases flowing through combustor 30 and combustor liner surface 80.

Each liner 42 and 44 includes a respective annular support flange 100 and 102 that is formed at each respective liner downstream end 48 and 52. More specifically, in the exemplary embodiment, each support flange 100 and 102 is formed integrally with each respective liner 42 and 44. Support flanges 100 and 102 are used to securely couple each combustor liner downstream end 48 and 52 to the turbine nozzle assembly. In one embodiment, at least one support flange 100 or 102 is fabricated from the same material used in fabricating the remainder of each respective liner 42 and 44. In another embodiment, at least one support flange 100 or 102 is fabricated from a different material than the material used in fabricating the remainder of each respective liner 42 and 44.

In the exemplary embodiment, a layer 110 of thermal barrier material is applied on each combustor liner surface 80. Thermal barrier material further insulates combustor liner surface 80 from high temperature combustion gases. In an exemplary embodiment, thermal barrier coating material is commercially available from Englehart Industries, Wilmington Mass. Alternatively, thermal barrier material is not applied to liner surfaces 80.

During operation, as atomized fuel is injecting into combustion zone 36 and ignited, heat is generated within zone 36. Although air enters combustion zone 36 through cooling features 88 and forms a thin protective boundary of air along combustor liner surface 80, a variation in exposure of combustor liner surfaces to high temperatures may induce thermal stresses into liners 40. As a result of continued exposure to thermal stresses, over time, liners 40 may become deteriorated.

Deteriorated regions of combustor liners 40 may be removed and replaced using the methods described herein. More specifically, deteriorated regions of either liner 42 or 44 may be removed and replaced using the methods described herein. If a field returned engine, such as engine 10, includes at least one deteriorated liner 40, a circumferential cut is made through combustor liner 40. More specifically, as shown in FIG. 3, the cut is made radially through liner 40, as illustrated with line 122, (or alternatively with line 120 as shown in FIG. 4), such that the cut extends from liner exterior surface 82 to liner interior surface 80, and such that a portion 124 of liner 40 remains secured within combustor 30. More specifically, the cut is made radially inwardly and slightly aft from an end 124 of a respective overhanging portion 84 that is upstream from the deteriorated region of liner 40. Support flange 100 or 102 is then uncoupled, such that the deteriorated region of liner 40 is removable from combustor 30.

After deteriorated regions of liner 40 are removed from combustor 30, a replacement liner portion (not shown) may be coupled to combustor liners 42 and/or 44. The replacement liner is formed to include cooling features 88 and a respective support flange 100 or 102, such that the replacement liner is sized substantially identical as the deteriorated region of liner 40 being replaced, and such that liner 40, for all practical purposes, is returned to substantially identical dimensions compared to the original predefined dimensional requirements.

The replacement liner is then welded into combustor liner 42 and/or 44, such that the replacement liner is welded to an existing portion of liner 40 that remains secured within combustor liner 42 and/or 44. More specifically, an upstream side (not shown) of the replacement liner is welded to a downstream side of the existing portion of liner 40. In one embodiment, electron beam, EB welding is used to secure the replacement liner within combustor 30. In another embodiment, tungsten inert gas, TIG, welding is used to secure the replacement liner within combustor 30. Support flange 100 or 102 is recoupled to the turbine nozzle assembly, and thermal barrier coating material may then be applied on replacement liner surface 80. In one embodiment, the replacement liner includes material upgrades to facilitate extending a useful life of combustor 30. In another embodiment, the replacement liner includes cooling upgrades, including, but not limited to relocations, resizing, and changes in the number of cooling features 88.

Because deteriorated liners are replaced using the method described herein, combustors 30 are returned to service using a replacement process that facilitates improved savings in comparison to removing and replacing entire combustor liners 40. Furthermore, because the replacement liners are formed to be substantially identical to originally installed liners 40, aerodynamic performance and combustor performance are not adversely impacted by the replacement liners.

The above-described combustor liner replacement method is cost-effective and reliable for combustors including forged, unitary liners. The method includes the steps of removing deteriorated liner regions from the combustor liner, such that the deteriorated regions may be replaced with replacement liner portions. In one embodiment, the deteriorated liner regions are removed by cutting through the liner, and replacement liners are then welded to the portion of the liner that remains secured within the combustor. As a result, a method is provided which enables deteriorated combustor liner regions to be removed and replaced in a cost-effective and reliable manner.

Exemplary embodiments of combustor liner replacement are described above in detail. The methods are not limited to the specific embodiments described herein, but rather, aspects of each method may be utilized independently and separately from other methods described herein. Each combustor component can also be used in combination with other combustor components.

While the invention has been described in terms of various specific embodiments, those skilled in the art will recognize that the invention can be practiced with modification within the spirit and scope of the claims.

What is claimed is:

1. A method for replacing a gas turbine engine combustor liner, the combustor having a combustion zone formed by inner and outer liners, the inner and outer liners each including a plurality of cooling features formed by overhanging portions of the inner and outer liner liners, said method comprising:
   cutting through at least one of the combustor inner and outer liner aft of an overhanging portion, such a portion of the combustor liner upstream from the cut remains coupled within the combustor;
   removing the portion of the combustor liner that is aft of the cut;
   installing a replacement liner within the combustor such that the replacement liner extends aftward from the portion of the combustor liner that is upstream from the cut; and
   coupling a replacement liner including a downstream end that includes a support flange, within the combustor.

2. A method in accordance with claim 1 wherein each liner includes an upstream end, a downstream end, and a body extending between, said cutting through at least one of the combustor inner and outer liner further comprises cutting radially through the at least one liner a distance from a downstream end of the liner.

3. A method in accordance with claim 1 wherein said installing a replacement liner further comprises welding the replacement liner to the existing portion of the liner that is secured within the combustor.

4. A method in accordance with claim 1 wherein each liner includes an upstream end, a downstream end, and a body extending therebetween, each liner downstream end including a support flange used to couple the liner within the combustor, said cutting through at least one of the combustor inner and outer liner further comprises cutting through the at least one combustor liner such that the portion of the liner including the support flange is uncoupled from the combustor.

5. A method in accordance with claim 1 wherein each liner includes an inner surface and an outer surface, said method further comprises applying thermal barrier material to the inner surface of each replacement liner attached within the combustor.

6. A method for replacing a portion of a combustor liner within a gas turbine engine combustor, the combustor having a combustion zone formed by an inner and outer liner, the inner and outer liners each including a support flange formed at a downstream end of each liner, said method comprising:
   cutting between an outer surface and an inner surface of at least one of the inner and the outer liners;
   removing the portion of the at least one of the outer and inner liner that is aft of the cut;
   installing a replacement liner into the combustor to replace the portion of the liner removed from the combustor; and
   coupling the replacement liner aft end to the combustor using a support flange formed on the replacement liner.

7. A method in accordance with claim 6 wherein the combustor further includes an upstream end and a downstream end, a downstream end of each inner and outer liner including a support flange, said cutting between an outer surface and an inner surface further comprising the step of cutting through the at least one of the inner and outer liner such that a portion of the liner including the support flange is uncoupled from the combustor..

8. A method in accordance with claim 7 wherein installing a replacement liner further comprises welding the replacement liner to the existing liner portion that is secured within the combustor.

9. A method in accordance with claim 7 wherein installing a replacement liner further comprises welding the replacement liner including a support flange to the existing liner portion that is secured within the combustor.

10. A method in accordance with claim 6 further comprising applying thermal barrier material to the inner surface of the replacement liner.

11. A method in accordance with claim 6 wherein at least one of the inner liner and the outer liner includes an upstream end, a downstream end, and a body extending therebetween, the body unitary and comprising a plurality of cooling features formed by overhanging portions of the inner and outer liner liners, the overhanging portions spaced intermittently between the upstream and downstream ends, said cutting between an outer surface and an inner surface of at least one of the inner and the outer liners further comprising cutting through the liner in close proximity to and aft of an overhanging portion.

12. A method for replacing a portion of at least one deteriorated combustor liner within a gas turbine engine combustor, the at least one deteriorated liner including an inner surface and an outer surface, said method comprising:
   cutting radially through the at least one deteriorated liner between the outer and inner surfaces;
   removing the portion of the at least one deteriorated combustor liner that is aft of the cut from the combustor;
   installing a replacement liner into the combustor to replace the portion of the liner removed from the combustor; and
   coupling the replacement liner aft end to the combustor using a support flange formed at an aft end of the replacement liner.

13. A method in accordance with claim 12 wherein removing the portion of the deteriorated combustor liner that is aft of the cut comprises:
   uncoupling a support flange formed at an aft end of the liner from the combustor; and
   removing the deteriorated liner such that the support flange is removed with the portion of the liner being removed.

14. A method in accordance with claim 12 wherein the liner extends unitarily between an upstream end and a downstream end, and includes a plurality of cooling features formed by overhanging portions that are spaced between the upstream and downstream ends, said cutting radially through the deteriorated liner between the outer and inner surfaces comprises cutting radially through the liner in close proximity to and aft of an overhanging portion.

15. A method in accordance with claim 14 wherein installing a replacement liner further comprises welding the replacement liner to the existing portion of the liner that is secured within the combustor.

16. A method in accordance with claim 14 wherein installing a replacement liner further comprises welding the replacement liner including a support flange to the existing liner portion that is secured within the combustor.

17. A method in accordance with claim 14 further comprising applying thermal barrier material to the inner surface of the replacement liner.

* * * * *